(No Model.)
L. MANGOLD & C. GRIMM.
HARROW.
No. 346,117.  Patented July 27, 1886.
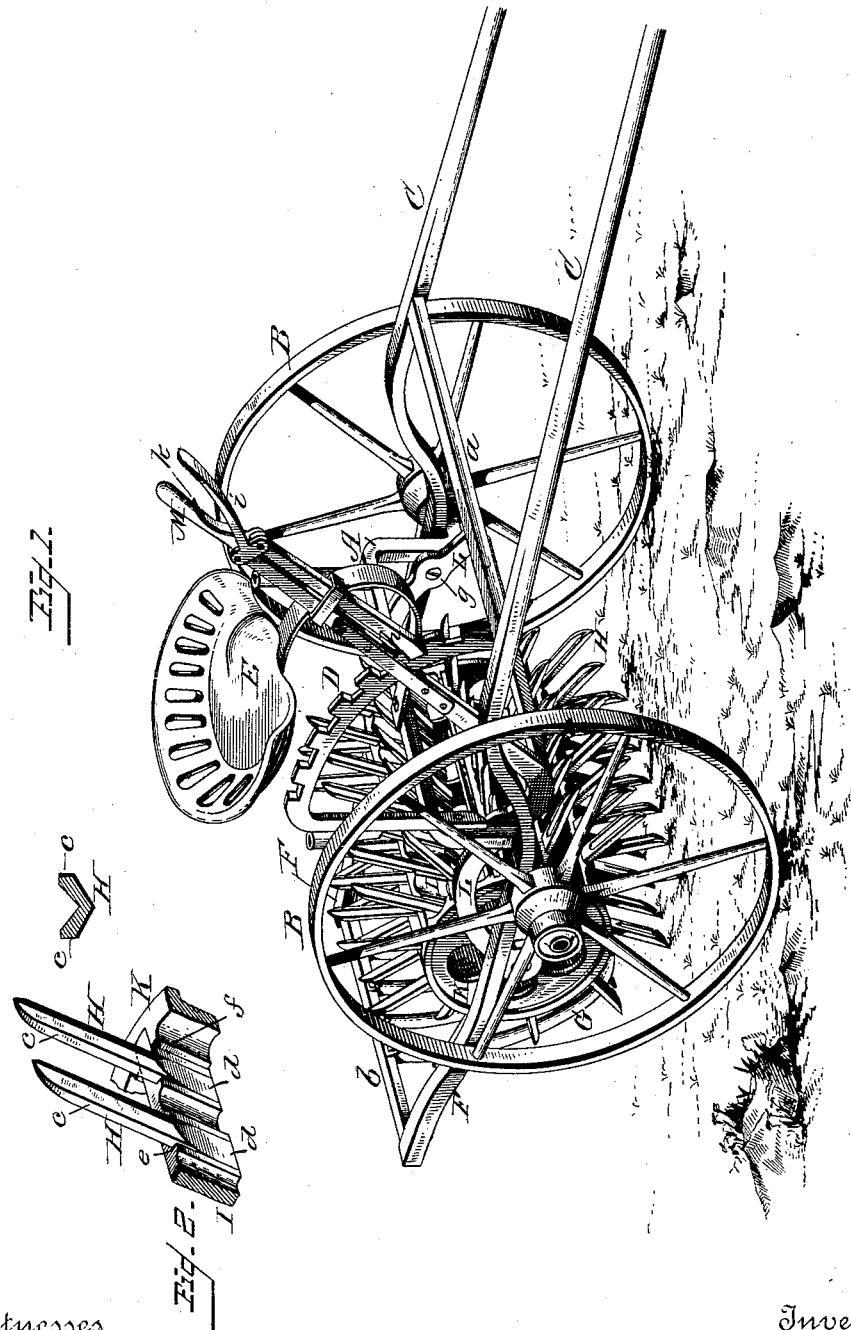
Witnesses
Inventors
Leonard Mangold
Charles Grimm.
By his Attorney
Chas. H. Fowler

UNITED STATES PATENT OFFICE.

LEONARD MANGOLD AND CHARLES GRIMM, OF CHATTANOOGA, TENN.

HARROW.

SPECIFICATION forming part of Letters Patent No. 346,117, dated July 27, 1886.

Application filed March 8, 1886. Serial No. 194,415. (No model.)

*To all whom it may concern:*

Be it known that we, LEONARD MANGOLD and CHARLES GRIMM, citizens of the United States, residing at Chattanooga, in the county of Hamilton and State of Tennessee, have invented certain new and useful Improvements in Harrows; and we do hereby declare that the following is a full, clear, and exact description of the same, reference being had to the annexed drawings, making a part of this specification, and to the letters and figures of reference marked thereon.

Figure 1 of the drawings is a perspective view of our invention, and Fig. 2 a detail view showing the form of the harrow-teeth and manner of attaching them to the rotary drum.

The present invention has relation to rotary harrows or that class of agricultural machines employed for pulverizing the soil, and the object thereof is to simplify the construction of the machine by entirely dispensing with the usual gearing, also rendering the teeth more effective on the soil, simplifying the construction of the rotary drum to render it both light and durable, and also facilitating the attachment of the teeth thereto, and simplifying the general construction of the machine and increasing its effectiveness. These objects we attain by the construction substantially as shown in the drawings, and hereinafter described and claimed.

In the accompanying drawings, A represents the axle, to the ends of which are connected the wheels B. This axle is bent to form crank ends, the straight or longer portion being above the axis of the wheels, and has connected to it and to the cross-bar $a$ of the shafts C a notched segment-plate, D, a suitable spring-seat, E, being also attached to the axle.

A supporting-frame to which the shafts are usually attached is entirely dispensed with, and in lieu thereof the shafts back of the axle terminate in arms F on a plane lower than the shafts, and extend back some distance beyond the rim of the wheels and have connected to them a transverse bar, $b$. To the bar $b$ are attached in any suitable manner the upper ends of inwardly-curved cleaners G, between which the harrow-teeth H pass. The teeth H are V shape, as shown in cross-section, Fig. 2, and have flat sides, as shown at $c$, to increase their effectiveness on the soil after the points of the teeth have entered it. The teeth have suitably-shaped shanks, $d$, which are seated and secured in correspondingly-formed sockets $e$ on the sides of bars I, and said bars at their ends enter flanged grooves $f$ in heads K and are suitably fastened in place.

The bars I and heads K constitute together the rotary drum or cylinder which carries the teeth H of the cultivator, and makes a very strong, light, and durable device for carrying the teeth, and by removing the fastenings which secure the bars to the heads the bars can be detached, and afterward the teeth, for repairs or for other purposes. This drum or cylinder is journaled to the rear ends of a frame, L, said frame being pivoted to the inner side of the crank ends of the axle A, as shown at $g$. The frame L at its front end and at one side thereof has a lever, M, in convenient reach of the driver upon the seat E. The lever M is guided by the segment-plate D, and when the frame L is raised or lowered it is held in its adjusted position by means of a pawl, $h$. The lower end thereof engages with the notches in the plate and the upper end pivoted to a small lever, $i$, which is in turn pivoted to the lever M, the pawl being retained in engagement with the notches in the segment-plate by means of a suitable spring, $k$.

We are aware that frames of harrows have been made in rectangular or other forms, and that such frames have been provided with cleaning-teeth in rear of the harrow-teeth. We are also aware that dovetail recesses have been constructed in the cross-bars of agricultural forks, in which are seated V-shaped teeth, and we do not claim such devices, broadly.

Having now fully described our invention, what we claim as new, and desire to secure by Letters Patent, is—

In a rotary harrow, the combination, with the shafts C, having extensions F and bar $b$, carrying cleaning-teeth G, of the arched axle A, having the wheels and seat E, the frame L, pivoted to said axle, the toothed drum K, pivoted to said frame, the rack G, also secured to the axle and frame L, and the lever M, connected to one arm of the frame L for raising and lowering said drum, as shown and described.

In testimony that we claim the above we have hereunto subscribed our names in the presence of two witnesses.

LEONARD MANGOLD.
CHARLES GRIMM.

Witnesses:
THOMAS BRIDGE,
F. O. WEST.